(12) United States Patent
Brooks et al.

(10) Patent No.: US 9,703,883 B2
(45) Date of Patent: Jul. 11, 2017

(54) SOCIAL BOOKMARKING OF RESOURCES EXPOSED IN WEB PAGES

(75) Inventors: David A. Brooks, Providence, RI (US); Alexander Kordun, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 1199 days.

(21) Appl. No.: 13/517,682

(22) Filed: Jun. 14, 2012

(65) Prior Publication Data
US 2012/0246558 A1 Sep. 27, 2012

Related U.S. Application Data

(63) Continuation of application No. 11/616,206, filed on Dec. 26, 2006, now Pat. No. 8,230,320.

(51) Int. Cl.
*G06F 17/00* (2006.01)
*G06F 17/30* (2006.01)

(52) U.S. Cl.
CPC ............................. *G06F 17/30884* (2013.01)

(58) Field of Classification Search
CPC .............................................. G06F 17/30884
USPC ....................................................... 715/206
See application file for complete search history.

(56) References Cited

U.S. PATENT DOCUMENTS

| 5,917,491 A * | 6/1999 | Bauersfeld | G06F 3/0483 707/E17.013 |
| 6,219,679 B1 * | 4/2001 | Brisebois | G06F 17/30855 707/E17.013 |
| 6,321,228 B1 * | 11/2001 | Crandall | G06F 17/30864 |
| 6,460,060 B1 * | 10/2002 | Maddalozzo, Jr. | G06F 17/30884 707/E17.114 |
| 6,519,617 B1 * | 2/2003 | Wanderski | G06F 17/2247 707/E17.118 |
| 7,028,032 B1 * | 4/2006 | Diedrich | G06F 17/30884 |
| 7,085,997 B1 * | 8/2006 | Wu | G06F 17/30884 707/E17.114 |
| 7,246,308 B1 * | 7/2007 | Leblang | G06F 17/30873 707/E17.111 |
| 7,562,287 B1 * | 7/2009 | Goldstein | G06Q 30/02 715/201 |
| 2002/0065842 A1 * | 5/2002 | Takagi | G06F 17/30905 709/217 |

(Continued)

*Primary Examiner* — Laurie Ries
(74) *Attorney, Agent, or Firm* — BainwoodHuang (57) ABSTRACT

A system for social bookmarking of a resource provided through a Web application that doesn't follow the representational state transfer architectural style (REST). When processing a request for a social bookmarking operation, the system searches for a URL and potentially other resource information within the document object model of a currently loaded Web page. If such resource information is found, it is used to process the requested social bookmarking operation. Otherwise, if such resource information is not found in the document object model, the system uses the URL stored in the location bar of the Web browser to process the requested social bookmarking operation. The system includes semantic information in the DOM of a Web page that is used to identify subsets of content within the Web page that can be socially bookmarked. The semantic information may be stored in what is generally referred to as "microformatting".

22 Claims, 6 Drawing Sheets

(56) References Cited

U.S. PATENT DOCUMENTS

| | | | |
|---|---|---|---|
| 2002/0161835 A1* | 10/2002 | Ball | G06F 3/14 709/203 |
| 2003/0009496 A1* | 1/2003 | McBrearty | G06F 17/30884 715/206 |
| 2003/0023754 A1* | 1/2003 | Eichstadt | G06F 17/30873 709/246 |
| 2003/0061275 A1* | 3/2003 | Brown | H04L 67/02 709/203 |
| 2003/0229677 A1* | 12/2003 | Allan | G06F 17/30887 709/217 |
| 2004/0122951 A1* | 6/2004 | Beck | G06F 17/30887 709/227 |
| 2004/0187074 A1* | 9/2004 | Keohane et al. | 715/501.1 |
| 2004/0205502 A1* | 10/2004 | Baird | G06F 17/30884 715/207 |
| 2005/0108636 A1* | 5/2005 | Sylthe | G06F 17/217 715/251 |
| 2005/0204292 A1* | 9/2005 | Kibilov | G06F 17/30876 715/738 |
| 2005/0257400 A1* | 11/2005 | Sommerer | G06F 17/30873 36/13 |
| 2006/0069699 A1* | 3/2006 | Smadja | G06F 17/30879 |
| 2006/0155780 A1* | 7/2006 | Sakairi | G06F 17/30867 |
| 2006/0173985 A1* | 8/2006 | Moore | G06F 17/3089 709/223 |
| 2007/0043745 A1* | 2/2007 | Rojer | G06F 17/30884 |
| 2007/0067217 A1* | 3/2007 | Schachter | G06Q 30/0269 705/14.66 |
| 2007/0067331 A1* | 3/2007 | Schachter | G06Q 30/02 |
| 2007/0106627 A1* | 5/2007 | Srivastava | G06Q 10/10 706/20 |
| 2007/0185858 A1* | 8/2007 | Lu | G06F 17/30864 |
| 2007/0271498 A1* | 11/2007 | Schachter | G06F 17/30884 715/205 |
| 2008/0027914 A1* | 1/2008 | Caputo | G06F 17/30884 |
| 2008/0040674 A1* | 2/2008 | Gupta | G06F 17/30884 715/745 |
| 2008/0065737 A1* | 3/2008 | Burke | G06F 17/30058 709/217 |
| 2008/0086471 A1* | 4/2008 | Ritter et al. | 707/8 |
| 2008/0127153 A1* | 5/2008 | Liu | G06F 9/4426 717/162 |

* cited by examiner

SOCIAL BOOKMARKING OF RESOURCES EXPOSED IN WEB PAGES

CROSS REFERENCE TO RELATED APPLICATIONS

The present application is a Continuation under 35 U.S.C. 120 of commonly assigned prior U.S. application Ser. No. 11/616,206, filed Dec. 26, 2006, in the names of David A. Brooks and Alexander Kordun, now allowed.

FIELD OF THE INVENTION

The present invention relates generally to social bookmarking systems, and more specifically to a method and system for social bookmarking of resources exposed in Web pages.

BACKGROUND OF THE INVENTION

As it is generally known, the term "bookmarks" has been used to refer to pointers, primarily URLs ("Uniform Resource Locators"), that are stored by Web browser programs for the convenience of the local user. The primary purpose of these user-specific, locally stored and used bookmarks has been to catalog and provide access to Web pages that the local user has visited or plans to visit, without requiring the user to remember their URLs.

More recently, technologies providing "social bookmarking" have been introduced. In social bookmarking systems, social bookmarks are shared with multiple users over the Internet. In a social bookmarking system, users store lists of links to Internet resources that they find useful or interesting. These resource lists are accessible to other users, e.g. to the general public or to a network of related users. Social bookmarking system users are able to rate and categorize resources using informally assigned, user-defined keywords or tags to create a "folksonomy". The folksonomy provides aggregate page ratings across multiple users, and relates users that have tagged the same page. Most social bookmarking services allow users to search for social bookmarks based on tags, and rank resources by the number of users that have socially bookmarked them.

Many popular social bookmarking systems rely on Web applications using what is referred to as a representational state transfer (REST) architectural style for resource identification, in which every resource is uniquely addressable using a universal syntax. However, not all Web applications provide this type of resource identification.

Some existing Web applications encode the navigational state of a user's session within the URL (Uniform Resource Locator) that is sent over HTTP (HyperText Transfer Protocol). As a result, no two users will obtain the same URL even though they are viewing the same resource.

Other existing Web applications have the opposite problem, in which a single URL is used to represent many resources exposed through a Web page. This is the case in many recent AJAX (Asynchronous JavaScript and XML) based Web applications, in which the loaded Web browser URL is not changed even though the user requests and receives views of different resources exposed through the page. One example of such behavior may be observed when a user clicks to view an e-mail (electronic mail) message in the Gmail client provided by Google®. Even though the requested message is exposed to the user through the Web browser, the current URL loaded in the Web browser is not changed. Web applications that use server session state (e.g. a user identifier and/or other session information) may also result in mapping multiple resources to a single URL.

When exposed to either of the above described types of non-RESTful existing systems, social bookmarking systems do not perform as expected. Existing social bookmarking systems rely on the fact that a single URL represents a single resource on the Web. For Web sites in which a resource's URL is different for each visit, two users will never be able to socially bookmark the resource with the same URL. This prevents a social bookmarking application from understanding a Web page as a single resource in its folksonomy. Web sites using a single URL to expose multiple resources in a Web page will cause false social bookmarking calculations, resulting from the fact that the social bookmarking system believes two users have bookmarked the same resource, when in fact they have attempted to bookmark different resources exposed within a single Web page.

Existing social bookmarking systems use bookmarklets to determine information about a Web page currently loaded in a Web browser. Bookmarklets are standard Web browser hyperlinks containing JavaScript. When a user clicks on a hyperlink button or the like provided by a bookmarklet, the JavaScript of the bookmarklet executes to obtain information about the currently loaded Web page from the document object model (DOM) of the Web page. Such Web page information includes the URL of the Web page, a title of the Web page, and sometimes a description of the Web page. The bookmarklets for a social bookmarking service may be provided by the social bookmarking service. Bookmarklets perform social bookmarking operations, such as adding a currently loaded Web page to the user's social bookmarks, and/or adding a tag to the currently loaded Web page in the bookmarking system. Existing bookmarklets generate pop-up windows in the user interface providing a Web form hosted by the social bookmarking Web site. This Web form is often pre-filled with information about the currently loaded Web page. A user can then add tags into the pop-up window to categorize the currently loaded Web page, and click on a "submit" button or the like to submit the added tags to the social bookmarking Web site. Some social bookmarking Web sites provide Web browser plug-in that perform the same type of operations.

A shortcoming of existing systems related to social networking bookmarklets is the inability to obtain useful information from some Web sites regarding resources that they expose to the user, without changing the currently loaded Web page. For example, in some existing Web portals, the title and description for portlet resources within the portal Web page are defined by the portal theme, and not by the specific portlet. Similarly, when a user requests a map through a map generation Web site, the currently loaded Web page does not change when the map is loaded unless the user clicks on a "Link" option in the user interface. Accordingly, when the user attempts to set social bookmarks to resources exposed through such Web sites, different resources provided through a single Web page report the same title, and may have no available description. As a result, form fields in the bookmarklet generated pop-up window are pre-filled with the same information for multiple resources provided through the same Web page, without reflecting the specific resource currently being viewed.

For the above reasons, it would accordingly be desirable to have a new system for social bookmarking resources that does not rely on Web pages following the representational state transfer architectural style (REST), and that provides useful information regarding a resource exposed in a Web page without the user having to expressly link to the resource.

SUMMARY OF THE INVENTION

In order to address the above described and other shortcomings of the prior art, a new method and system are disclosed for social bookmarking of a resource provided through a Web application. When processing a request for a social bookmarking operation, the disclosed system searches for a URL and potentially other resource information within the document object model of a currently loaded Web page. If such resource information is found, then it is used to process the requested social bookmarking operation. Otherwise, if such resource information is not found in the document object model, then the disclosed system may use the URL stored in the location bar of the Web browser to process the requested social bookmarking operation.

In one embodiment, the disclosed system includes semantic information in the DOM of a Web page that can be used to identify socially bookmarkable resources exposed within the Web page, so that those resources can be socially bookmarked in an external social bookmarking system. The semantic information is stored in what are referred to as "microformats". In such an embodiment of the disclosed system, a Web page publishes microformat information indicating bookmarkable resources in the Web page. The disclosed microformatting enables an external social bookmarking system to effectively include each of multiple resources exposed by single Web page independently in a folksonomy.

A Web page including an embodiment of the disclosed system includes microformatting indicating consistent URLs (e.g. permalinks) that can reliably be used for returning corresponding resources contained exposed by the Web page. Using the disclosed microformatting, a social bookmarking engine can provide enhanced bookmarklets and/or an enhanced browser plug-in that scan the DOM for a currently loaded Web page, prior to returning resource information such as the URL, title, and description of the Web page to the social bookmarking service. The disclosed system enables Web portal server environments and the like to associate the disclosed microformatting with portlet resources that are visible through a portal Web page, enabling the user to effectively select and socially bookmark individual portal resources into an external social bookmarking system. A social bookmarking service can operate based on the disclosed microformatting in the DOM to provide a specialized user interface including social bookmarking and/or tagging options, e.g. within a drop down menu of socially bookmarkable resource titles in a pop-up window Web form, in a user interface in which one or more of the socially bookmarkable resources are outlined or shown with clickable options such as icons, or through some other appropriate user interface. When the user selects one of the socially bookmarkable resources, the disclosed system generates a pop-up window with a social bookmarking form pre-filled with information extracted from the microformatting corresponding to the socially bookmarkable resource, where the information is specific to that socially bookmarkable resource (e.g. title, description, permalink, etc.) Such capabilities advantageously allow first class user interface integration of existing social bookmarking engines into Web portal and Web applications.

Thus there is disclosed a new system for social bookmarking of a resource that does not rely on Web pages following the representational state transfer architectural style (REST), and that provides useful information regarding a resource exposed in a Web page without the user having to expressly link to the exposed resource.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
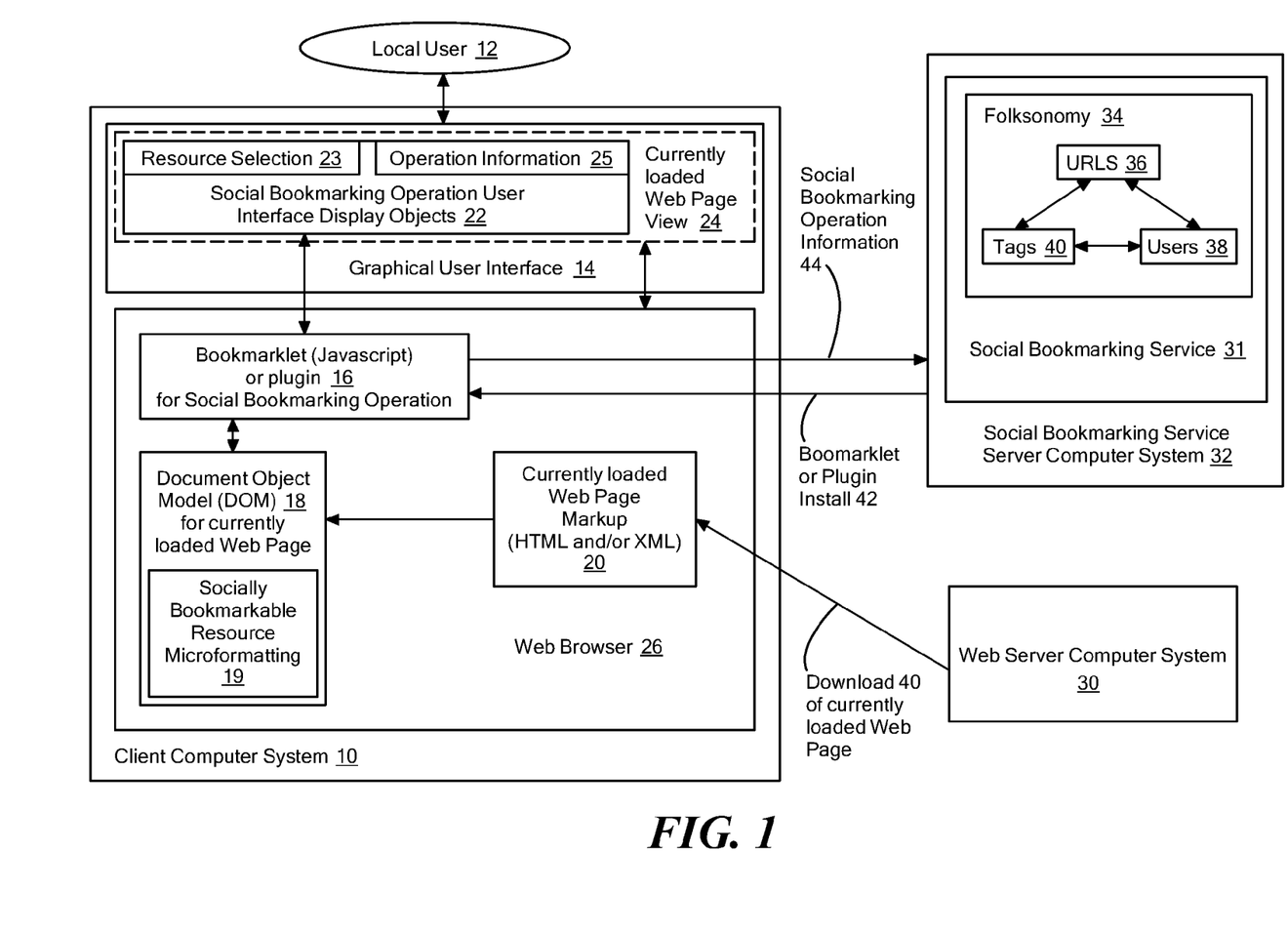
FIG. 1 is a block diagram showing components in an illustrative embodiment of the disclosed system.

FIG. 1 is a block diagram showing components in an illustrative embodiment of the disclosed system. As shown in FIG. 1, a Client Computer System 10 is associated with and used by a Local User 12. A Graphical User Interface 14 is provided to the Local User 12, in part through execution of a Bookmarklet or plug-in 16 that provides one or more social bookmarking operations to the Local User 12. The Graphical User Interface 14 may be any specific type of interactive user interface. The Graphical User Interface 14 may be navigated using any specific type of user interface device provided as part of the Client Computer System 10, such as a computer keyboard or mouse, and/or using voice commands or the like.

The Bookmarklet or plug-in 16 may, for example, be made up of JavaScript and/or other appropriate scripting language. When triggered, the Bookmarklet or plug-in 16 accesses the Document Object Model ("DOM") 18 of the currently loaded Web page in order to generate one or more Social Bookmarking Operation User Interface Display Objects 22 in the View 24 of the currently loaded Web page in the Graphical User Interface 14. The DOM 18 is built by a Web Browser 26 executing on the Client Computer System 10, in response to Markup 20 (e.g. HTML and/or XML) for the currently loaded Web page. The DOM 18 is a tree structured description of how the currently loaded Web page is to be represented in the View 24 within the Graphical User Interface 14. The DOM 18 provides a structure that facilitates access to the elements of the HTML and/or XML in the Web page Markup 20 for the currently loaded Web page, by scripting languages with object oriented features, such as JavaScript within the Bookmarklet or plug-in 16.

During operation of the illustrative embodiment shown in FIG. 1, the Bookmarklet or plug-in 16 is installed 42 from a Social Bookmarking Service 31 executing on a Social Bookmarking Service Server Computer System 32. Such installation may, for example, be performed when the Local User 12 signs up for or otherwise registers to use the Social Bookmarking Service 31. Also during operation of the embodiment shown in FIG. 1, the Markup 20 for the currently loaded Web page is loaded into the Web Browser 26 during a Web page Download 40. The Web page Download 40 is performed, for example, in response to the Local User 12 using the Web Browser 26 to navigate to the currently loaded Web page on a Web site provided by the Web Server Computer System 30.

Further during operation of the embodiment shown in FIG. 1, the Local User 12 accesses social bookmarking operations related to the Social Bookmarking Service 31, such as socially bookmarking resources exposed through the currently loaded Web page, tagging resources exposed through the currently loaded Web page, etc., through the Social Bookmarking Operation User Interface Display Objects 22. For example, the Local User 12 clicks on a button or other display object generated by the Bookmarklet or plug-in 16 in order to socially bookmark a specific, desired, resource exposed in the View 24 of the currently loaded Web page. Clicking on the button or the like causes the Bookmarklet or plug-in 16 to execute and to scan the DOM 18 in order to find Socially Bookmarkable Resource Microformatting 19 indicating one or more socially bookmarkable resources exposed in the currently loaded Web page. If such microformatting is found, then resource information contained in the microformatting, such a URL, is used to socially bookmark a resource exposed in the View 24. Otherwise, if no such microformatting is found, then, in one embodiment, the disclosed system uses the URL of the currently loaded Web page that is stored in the location bar of the Web browser to socially bookmarking the resource.

In one embodiment of the disclosed system, based on the Socially Bookmarkable Resource Microformatting 19 in the DOM 18, the Bookmarklet or plug-in 16 operate to provide one or more Resource Selection User Interface Display Objects 23 to the Local User 12, such as clickable icons, outlines, hyperlinks, a pull-down menu of resource titles, or the like. The Resource Selection User Interface Display Objects 23 may, for example, be displayed in close visual proximity to corresponding ones of potentially multiple socially bookmarkable resources in the currently loaded Web page. The Resource Selection User Interface Display Objects 23 enable the Local User 12 to indicate which of potentially multiple socially bookmarkable resources exposed to the Local User 12 through the currently loaded Web page the Local User 12 the Local User 12 desires to perform a social bookmarking operation on.

The Bookmarklet or plug-in 16 also operates to provide an Operation Information User Interface Display Object 25 (e.g. a pop-up window containing a user editable form) pre-filled with resource information specifically related to a user selected socially bookmarkable resource currently exposed within the View 24. The resource information is extracted from the Socially Bookmarkable Resource Microformatting 19 contained in the DOM 18. The resource information pre-filled into the Operation Information User Interface Display Object 25 may, for example, in the case where the currently loaded Web page exposes multiple socially bookmarkable resources to the Local User 12, be for a resource selected by the Local User 12 through the Resource Selection User Interface Display Object 23. The pre-filled resource information in the Operation Information User Interface Display Object 25 is user editable, and may consist, for example, of a URL such as a permalink (PERManent LINK) or the like that points to the socially bookmarkable resource and will remain unchanged, a title associated with the socially bookmarkable resource, a description (i.e. summary) of the socially bookmarkable resource, and one or more suggested tags associated with the socially bookmarkable resource.

The permalink provided in the DOM as a URL for a socially bookmarkable resource in the disclosed system is a unique URL assigned to that socially bookmarkable resource that remains permanent for that resource. For example, consistent with the use of permalinks in other contexts (e.g. in blogs), such a permalink may be made up of a base URL combined with one or more further identifying elements such as date, time, names and numbers or just a unique number. Thus, through use of an index, a Web site providing the resource through a Web page can keep track of the physical location of the resource and later convert the permalink to that address as needed to return the resource when it is subsequently requested using the permalink.

When the user has finished editing the resource information in the Operation Information User Interface Display Object 25, the resource information is sent together with a user identifier for the Local User 12 as Social Bookmarking Operation Information 44 to the Social Bookmarking Service 31 on the Social Bookmarking Service Server Computer System 32. The Social Bookmarking Service 31 then stores the Social Bookmarking Information 44 into a Folksonomy 34. The Folksonomy 34 relates URLs 36, Tags 40 and Users 38 provided to the Social Bookmarking Service 31 through social bookmarking operations performed by users registered with the Social Bookmarking Service 31.

The Client Computer System 10, Social Bookmarking Service Server Computer System 32, and Web Server Computer System 30 may be communicably connected using any specific kind of data communication network and/or protocol. The Client Computer System 10, Social Bookmarking Service Server Computer System 32, and Web Server Computer System 30 may each include at least one processor, program storage, such as memory and/or another computer readable medium, for storing program code (e.g. the Web Browser 26 and Bookmarklet or plug-in 16) executable on the processor, and for storing data operated on by such program code (e.g. the DOM 18 and Folksonomy 34). The Client Computer System 10, Social Bookmarking Service Server Computer System 32, and Web Server Computer System 30 may each further include one or more input/output devices and/or interfaces, such as data communication and/or peripheral devices and/or interfaces. The Client Computer System 10, Social Bookmarking Service Server Computer System 32, and Web Server Computer System 30 may further include appropriate operating system software.

Figure 2:
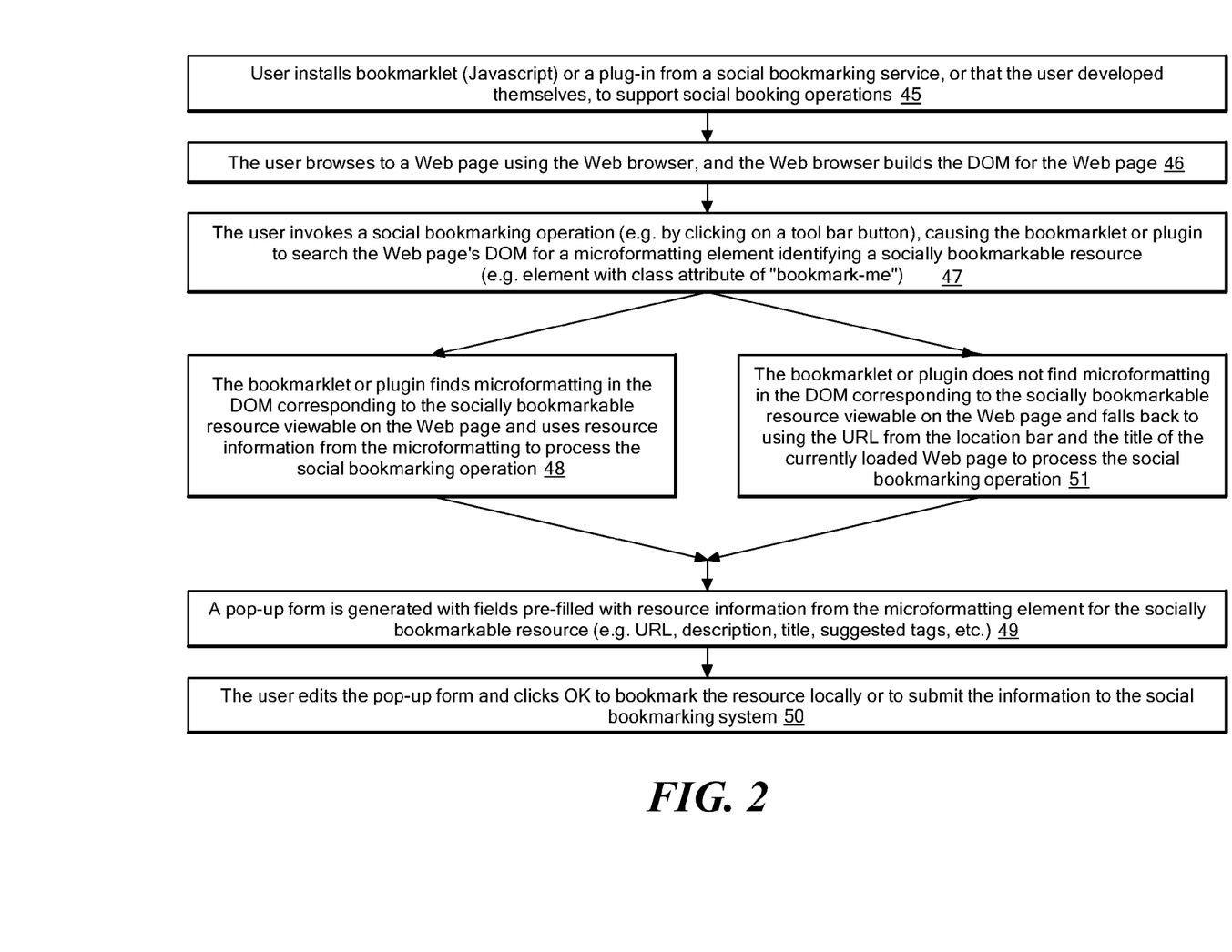
FIG. 2 is a flow chart showing steps performed during operation of an illustrative embodiment of the disclosed system.

FIG. 2 is a flow chart showing steps performed during operation of an illustrative embodiment of the disclosed system. As shown in FIG. 2, at step 45, a user installs a bookmarklet (JavaScript) or plug-in, obtained either from a social bookmarking service, or that the user has developed to support social bookmarking operations. At step 46 the user browses to a Web page using a Web browser, and the Web browser builds the Document Object Model (DOM) for the Web page.

At step 47, the user invokes a social bookmarking operation (e.g. by clicking on a tool bar button), causing the bookmarklet or plug-in to search the Web page's DOM for a microformatting element identifying a socially bookmarkable resource (e.g. an element with class attribute of "bookmark-me"). Step 47 is followed by either step 48 or step 51.

In step 48, the bookmarklet or plug-in finds microformatting in the DOM corresponding to a socially bookmarkable resource viewable on the Web page and, accordingly uses resource information from the microformatting to process the social bookmarking operation invoked at step 47. Step 47 is followed by step 49, in which a social bookmarking operation resource information user interface consisting of a pop-up window is generated with user editable form fields pre-filled with resource information from the microformatting element for the socially bookmarkable resource (e.g. URL, description, title, suggested tags, etc.). At step 50, the user edits the pop-up form and clicks OK to bookmark the resource locally or to submit the resource information in the form to the external social bookmarking system.

In the alternative case where step 47 is followed by step 51, at step 51 the bookmarklet or plug-in does not find microformatting in the DOM corresponding to the socially bookmarkable resource viewable on the Web page, and therefore uses the URL from the location bar and the title of the currently loaded Web page to process the social bookmarking operation. Accordingly, in such a case, the disclosed system uses the URL from the location bar and the title of the currently loaded Web page to pre-fill the form generated at step 49.

Figure 3:
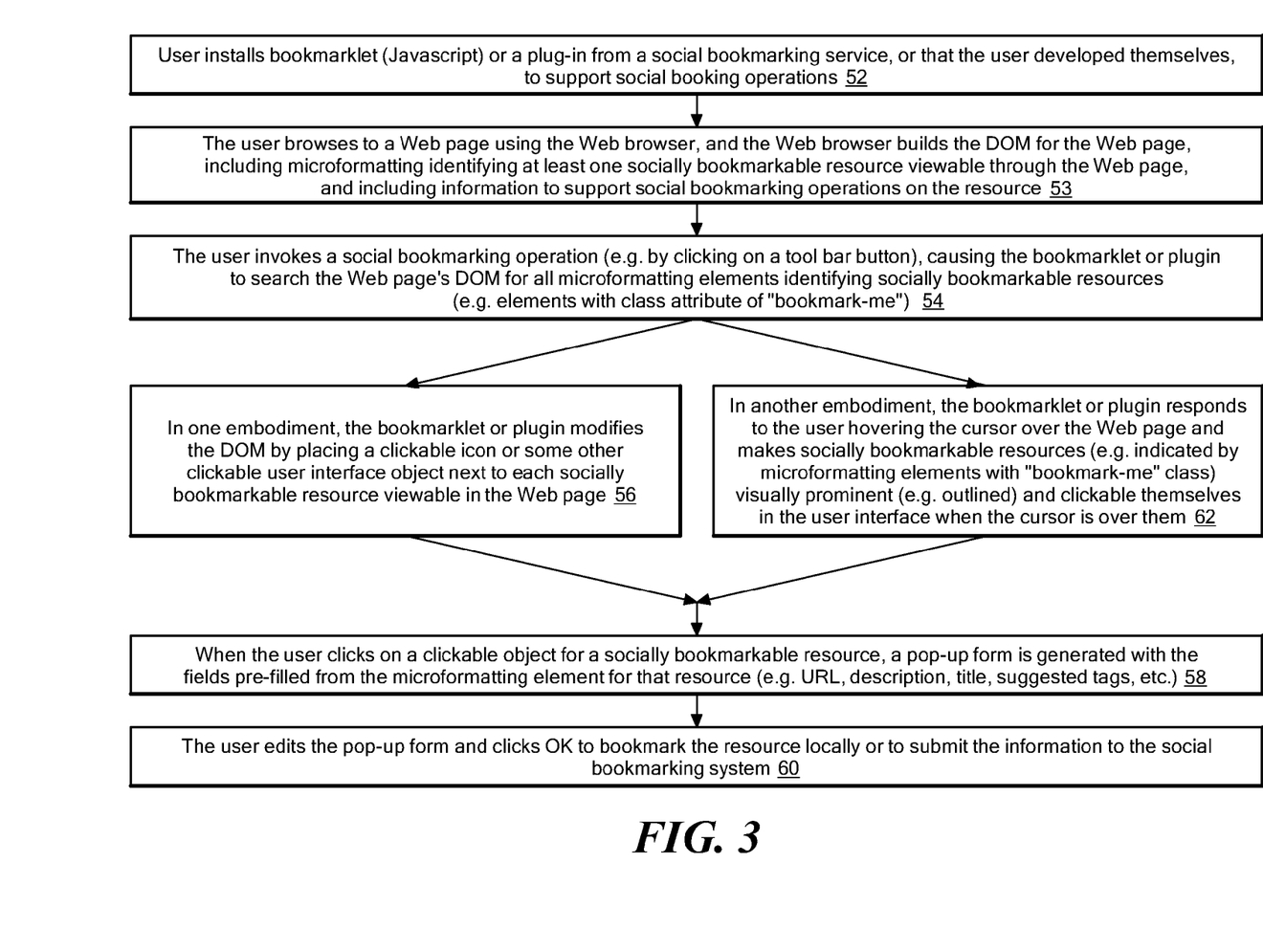
FIG. 3 is a flow chart showing steps performed during operation of two other illustrative embodiments of the disclosed system.

FIG. 3 is a flow chart showing steps performed during operation of two other illustrative embodiments of the disclosed system. As shown in FIG. 3, at step 52 a user installs a bookmarklet (JavaScript) or a plug-in, obtained either from a social bookmarking service, or that the user has developed to support social bookmarking operations. At step 53 the user browses to a Web page using a Web browser, and the Web browser loads the Web page and builds a Document Object Model (DOM) for the currently loaded Web page. The DOM built at step 53 includes microformatting identifying at least one socially bookmarkable resource viewable through the currently loaded Web page. The microformatting further includes resource information for each socially bookmarkable resource sufficient to support social bookmarking operations on that resource.

At step 54 the user invokes a social bookmarking operation (e.g. by clicking on a tool bar button or link provided through a tool bar in the Web browser). This causes the bookmarklet or plug-in to search the currently loaded Web page's DOM for all microformatting elements identifying socially bookmarkable resources. Microformatting elements identifying socially bookmarkable resources may, for example, be microformatting elements with a predetermined class attribute (e.g. "bookmark-me").

In a first embodiment shown in FIG. 3, step 54 is followed by step 56, in which the bookmarklet or plug-in modifies the DOM for the currently loaded Web page by displaying a clickable icon or some other clickable user interface object next to or within each socially bookmarkable resource viewable in the currently loaded Web page. After step 56, at step 58, when the user clicks on a clickable display object associated with a socially bookmarkable resource, a pop-up form is generated with resource information fields (e.g. description, suggested tags, title, URL) pre-filled with resource information from the microformatting element for that resource. Step 58 is followed by step 60, in which the user edits the resource information in the pop-up form and clicks OK to bookmark the resource locally and/or to submit the resource information to the social bookmarking service.

In another embodiment shown in FIG. 3, step 54 is followed by step 62, in which the bookmarklet or plug-in responds to the user hovering the cursor over the display of the currently loaded Web page and makes socially bookmarkable resources (e.g. those elements of the "bookmark-me" class) visually prominent (e.g. outlined) and clickable themselves in the user interface when the cursor is hovered over them. Step 62 is followed by step 58.

Figure 4:
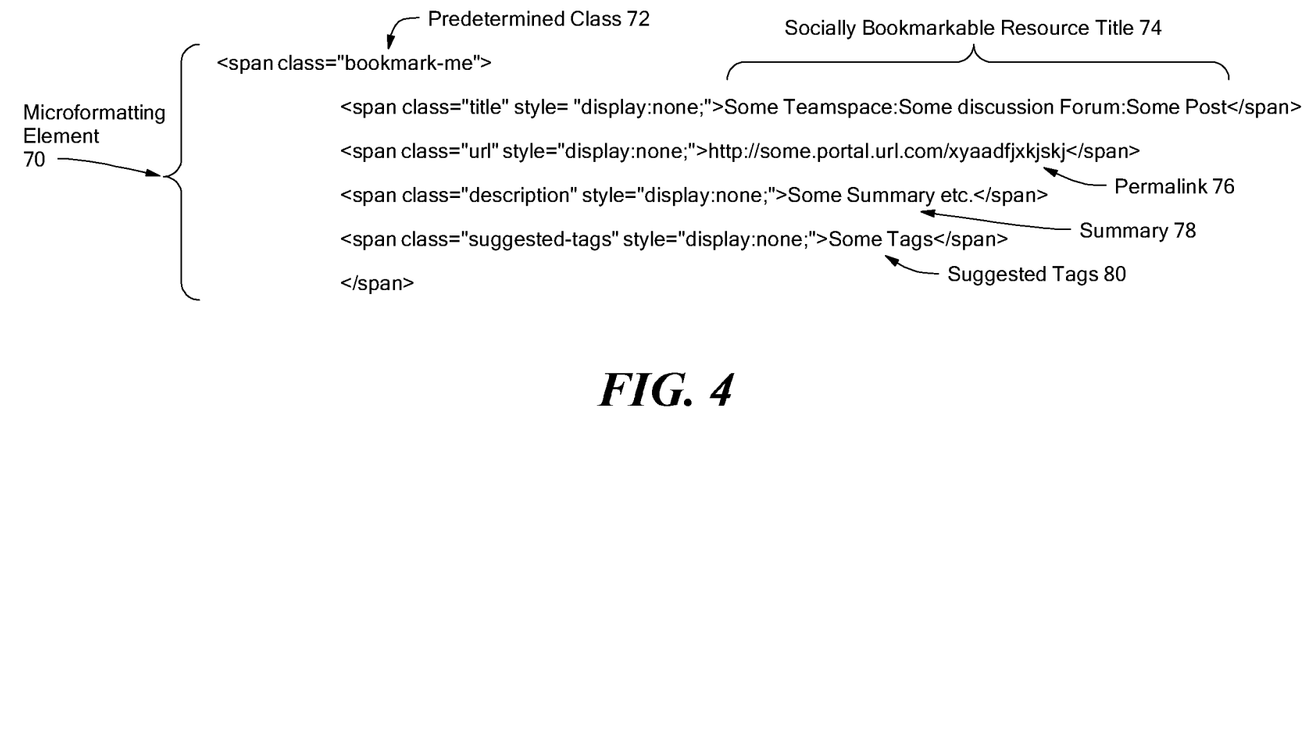
FIG. 4 is a pseudo-code example of a bookmarkable resource tag in the disclosed microformatting.

FIG. 4 is a pseudo-code example of a bookmarkable resource tag in the disclosed microformatting. FIG. 4 shows a Microformatting Element 70 that is an example of a semantic bookmarkable resource tag for a corresponding bookmarkable resource in the disclosed system. As shown in FIG. 4, Microformatting Element 70 has a Predetermined Class 72, shown only for purposes of illustration as "bookmark-me". The Predetermined Class 72 makes the Microformatting Element 70 recognizable to a bookmarklet or plug-in. The Microformatting Element 70 further includes a Socially Bookmarkable Resource Title 74 for the corresponding socially bookmarkable resource, shown only for purposes of illustration as "Some Teamspace: Some Discussion Forum: Some Post", a Permalink 76 for the corresponding socially bookmarkable resource, shown only for purposes of illustration as http://some.portal.url.com/xyaadfxkjskj, and Suggested Tags 80 for the socially corresponding socially bookmarkable resource, shown only for purposes of illustration as "some tags".

In an embodiment using the Microformatting Element 70 shown in FIG. 4, the bookmarklet and/or browser plug-in uses the JavaScript method document.getElementsByTagName("span"); to get all the SPAN entries in the DOM, and then loop through each of the located SPANs checking the class name in each for the value "bookmark-me". When a "bookmark-me" SPAN is found, the inner elements are added to the set of parameters used to generate a user editable pop-up window for the Operation Information User Interface Display Object 25 of FIG. 1. As shown in FIG. 4, the inner elements could include resource information such as "title", "url", "description", and a set of "suggested-tags". If no matching SPAN's are found then the bookmarklet/browser plug-in may fall back to techniques of pulling off the location.href and document.title for the currently loaded Web page for use as resource information. Advantageously, integration of such an embodiment of the disclosed system requires only an enhanced bookmarklet or plug-in, and no direct support by the social bookmarking service.

Figure 5:
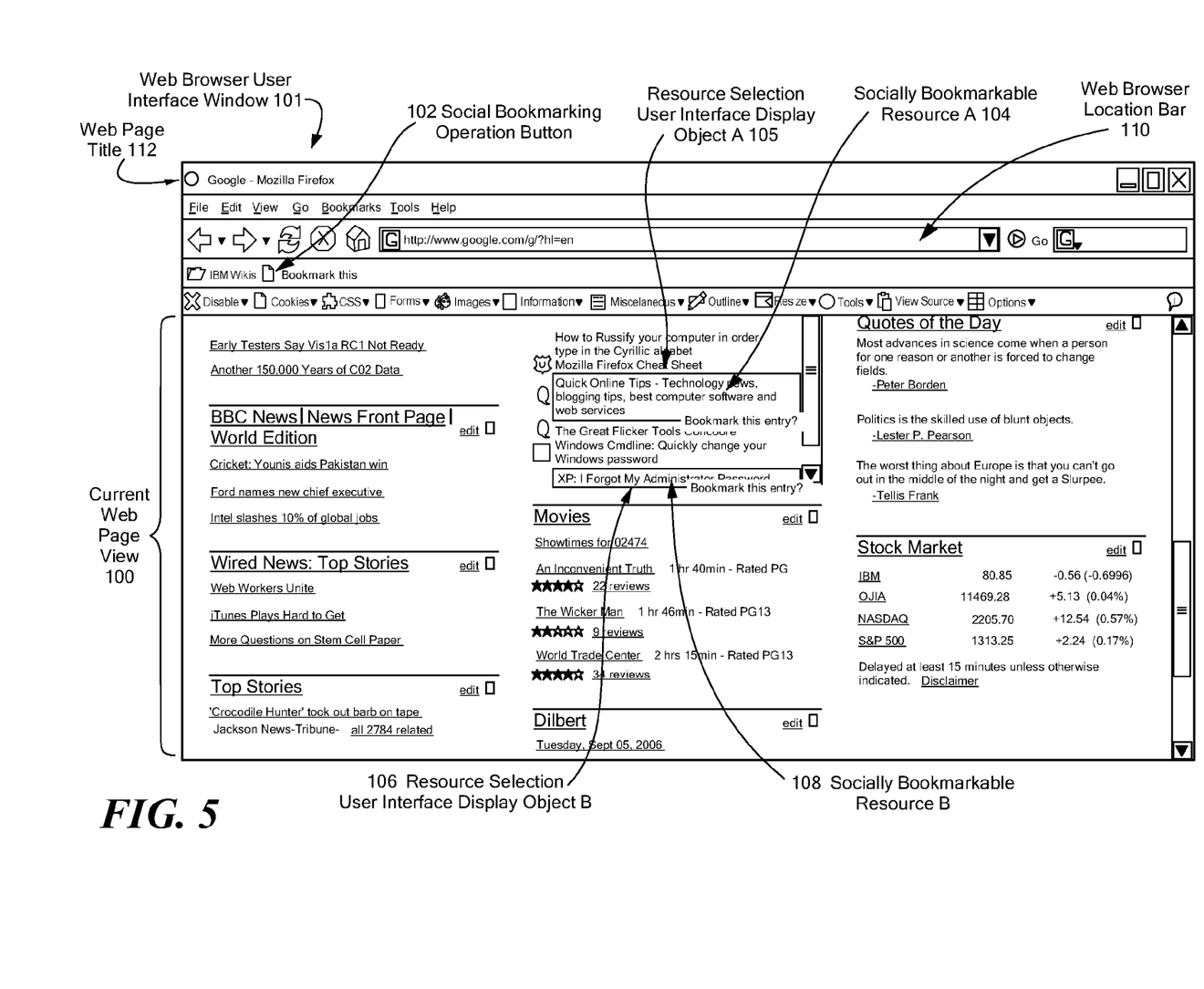
FIG. 5 is a screen shot showing an example of a user interface provided to a user that enables the user to locate and select from socially bookmarkable resources exposed through a Web page, as provided by an illustrative embodiment of the disclosed system.

FIG. 5 is a screen shot showing examples of the Resource Selection User Interface Display Object 23 within an example of the currently loaded Web page View 24 of FIG. 1. As shown in FIG. 5, a Current Web Page View 100 is provided through a Web Browser user interface window 101. An example of a Social Bookmarking Operation Button 102 is also shown in FIG. 5. The Social Bookmarking Operation Button 102 exposes a bookmarklet or plug-in providing features of the disclosed system. In one embodiment, in response to the user clicking on the Social Bookmarking Operation Button 102, visual outlines are displayed as the Resource Selection User Interface Display Objects 23 (FIG. 1) around each of multiple socially bookmarkable resources displayed in the currently loaded Web page. Each visually outlined socially bookmarkable resource is made clickable to enable a user to indicate selection of that socially bookmarkable resource by the user for a social bookmarkable operation (e.g. social bookmarking or tagging), and to cause the Operation Information User Interface Display Object 25 (FIG. 1) to be displayed pre-filled with resource information for the selected socially bookmarkable resource.

Figure 6:
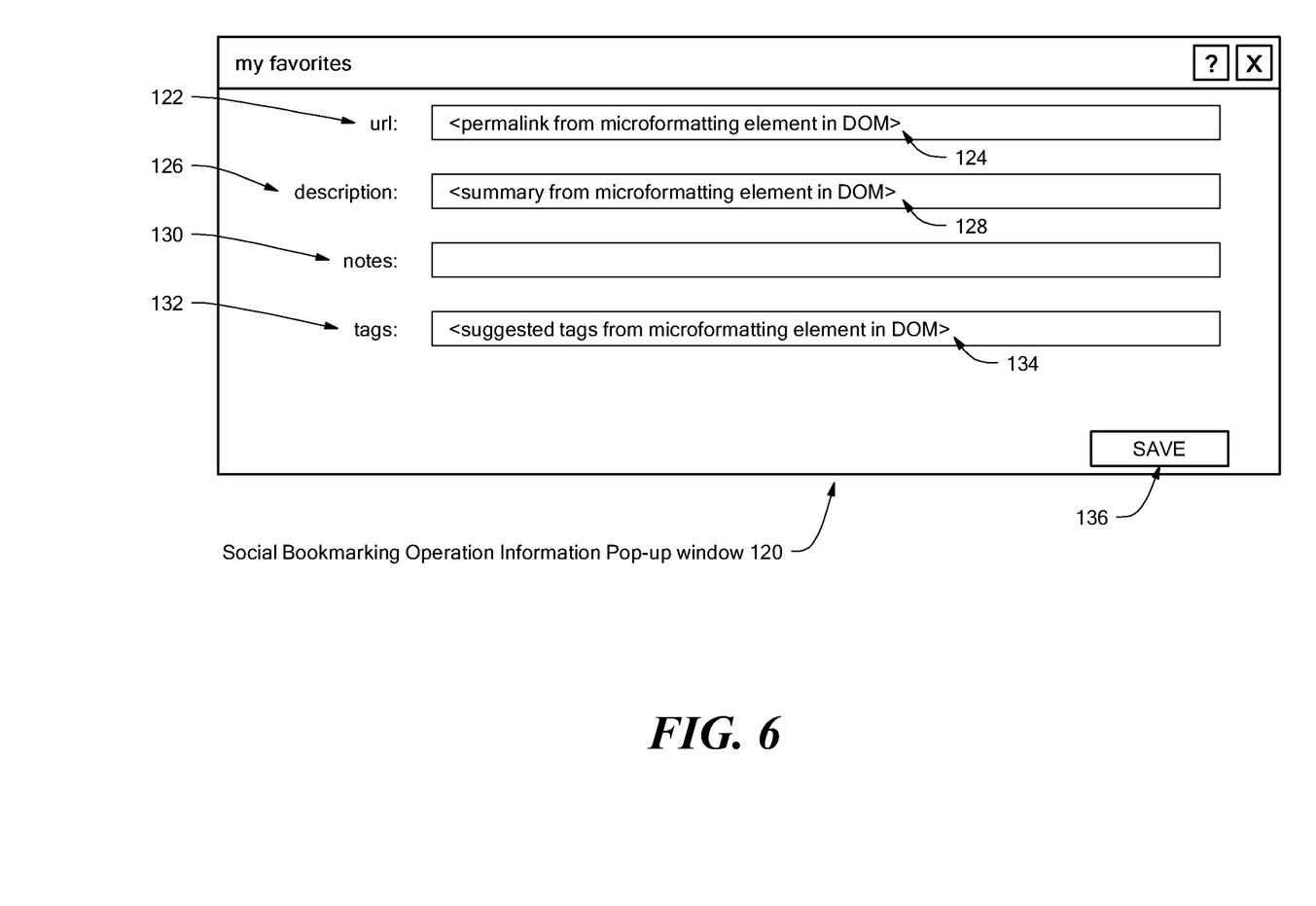
FIG. 6 shows a pop-up user interface window generated by an illustrative embodiment of the disclosed system to enable the user to socially bookmark a resource.

For example, as shown in FIG. 6, by clicking on the Social Bookmarking Operation Button 102, the user causes the bookmarklet or plug-in to display Resource Selection User Interface Display Object A 105 and Resource Selection User Interface Display Object B 106 as visual outlines (and also including the "Bookmark this entry?" text) around the Socially Bookmarkable Resource A 104 and the Socially Bookmarkable Resource B 108. In an alternative embodiment, the Resource Selection User Interface Display Object A 105 and Resource Selection User Interface Display Object B 106 are displayed in response to the user hovering the cursor over the respective socially bookmarkable resources they surround. The disclosed system further operates to make either the Socially Bookmarkable Resources 104 and 108 and/or the Resource Selection User Interface Display Objects 105 and 106 clickable, either immediately when the user clicks on the button 102 or when the user subsequently hovers the cursor over the respective socially bookmarkable resource. Through such clickable regions in the user interface, the user is then able to indicate which of Socially Bookmarkable Resource A 14 or Socially Bookmarkable Resource B 108 they desire to socially bookmark. Accordingly, if the user subsequently clicks on the clickable portion of the Socially Bookmarkable Resource A 104 and/or Resource Selection User Interface Object A 105, the disclosed system provides an Operation Information User Interface Display Object 25 (FIG. 1) pre-filled with resource information associated with the Socially Bookmarkable Resource A 104. Alternatively, if the user subsequently clicks on the clickable portion of the Socially Bookmarkable resource B 108 and/or Resource Selection User Interface Object 106, the disclosed system provides an Operation Information User Interface Display Object 25 (FIG. 1) pre-filled with resource information associated with the Socially Bookmarkable Resource B 108.

FIG. 6 shows a pop-up user interface window generated by an illustrative embodiment of the disclosed system to enable the user to socially bookmark a socially bookmarkable resource, as provided by an illustrative embodiment of the disclosed system. The Social Bookmarking Operation Information Pop-up window 120 shown in FIG. 6 is an example of the Operation Information User Interface Display Object 25 shown in FIG. 1. All fields in the Social Bookmarking Operation Information Pop-up window 120 are user editable.

As shown in FIG. 6, the Social Bookmarking Operation Information Pop-up window 120 includes a url: field 122 pre-filled with a permalink 124 for the socially bookmarkable resource extracted from the microformatting information stored in the DOM. A description field 126 is pre-filled with a summary for the socially bookmarkable resource, extracted from the microformatting information stored in the DOM. A notes: field 130 is provided so the user can enter their own notes regarding the socially bookmarkable resource, and a tags: field 132 is pre-filled with suggested tags 134 extracted from the micro formatting information stored in the DOM.

When the user clicks on the SAVE button 136, the information in the fields of the Social Bookmarking Operation Information Pop-up window 120 is transmitted to the social bookmarking service for storing into a folksonomy.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method of providing social bookmarking of Web resources, comprising:

receiving a request for a social bookmarking operation;

responsive to said request for said social bookmarking operation, searching a document object model (DOM) of a currently loaded Web page for elements identifying corresponding socially bookmarkable resources displayed within said currently loaded Web page by checking elements in said DOM for elements having a class name matching a predetermined class name, wherein each of said socially bookmarkable resources identified by an element found in said searching is available for performing said requested social bookmarking operation, and modifying said DOM of said currently loaded Web page by placing a resource selection user interface object next to each one of said socially bookmarkable resources identified by elements found in said searching of said DOM;

displaying said resource selection user interface display objects within said currently loaded Web page, wherein each of said resource selection user interface display objects visually indicates a corresponding one of said socially bookmarkable resources identified by elements found in said searching of said DOM;

detecting a user clicking on one of said resource selection user interface display objects; and performing said requested social bookmarking operation by bookmarking, in an external social bookmarking system, the corresponding one of the socially bookmarkable resources indicated by the resource selection user interface object clicked on by the user.

2. The method of claim 1, wherein said resource selection user interface display objects comprise visual outlines around each of said socially bookmarkable resources.

3. The method of claim 1, wherein said resource selection user interface display objects comprise text displayed near each of said socially bookmarkable resources.

4. The method of claim 1, wherein said resource selection user interface display objects comprise icons displayed near each of said socially bookmarkable resources.

5. The method of claim 1, wherein each of said resource selection user interface display objects are displayed responsive to said user hovering a cursor over a corresponding one of said socially bookmarkable resources.

6. The method of claim 1, wherein said performing said requested social bookmarking operation comprises sending resource information contained in said element in said document object model (DOM) of said currently loaded Web page that identifies said corresponding one of said socially bookmarkable resources visually indicated by said one of said resource selection user interface display objects clicked on by the user to said external social bookmarking system.

7. The method of claim 6, wherein said performing said requested social bookmarking operation further comprises tagging, in said external social bookmarking system, said corresponding one of said socially bookmarkable resources indicated by said one of said resource selection user interface objects clicked on by the user with at least one suggested tag contained in said element identifying said corresponding one of said socially bookmarkable resources indicated by said resource selection user interface object clicked on by the user; and wherein said information contained in said element identifying said corresponding one of said socially bookmarkable resources indicated by said resource selection user interface object clicked on by the user and sent to said external social bookmarking system includes said at least one suggested tag.

8. The method of claim 1, wherein said performing said requested social bookmarking operation comprises:

generating an operation information user interface display object; and pre-filling said operation information user interface display object with resource information describing said socially bookmarkable resource, said resource information extracted from a corresponding one of said elements in said document object model, and wherein said resource information includes a uniform resource locator for said socially bookmarkable resource.

9. The method of claim 8, wherein said consistent uniform resource locator comprises a permalink.

10. The method of claim 8, wherein said resource information further includes a title for said socially bookmarkable resource.

11. The method of claim 8, wherein said resource information further includes a summary for said socially bookmarkable resource.

12. A system comprising:
at least one processor;
at least one computer readable memory, said computer readable memory having program code stored thereon, said program code comprising:
program code for receiving a request for a social bookmarking operation;
program code for, responsive to said request for said social bookmarking operation, searching a document object model (DOM) of a currently loaded Web page for elements identifying corresponding socially bookmarkable resources displayed within said currently loaded Web page by checking elements in said DOM for elements having a class name matching a predetermined class name, wherein each of said socially bookmarkable resources identified by an element found in said searching is available for performing said requested social bookmarking operation, and modifying said DOM of said currently loaded Web page by placing a resource selection user interface object next to each one of said socially bookmarkable resources identified by elements found in said searching of said DOM;
program code for displaying said resource selection user interface display objects within said currently loaded Web page, wherein each of said resource selection user interface display objects visually indicates a corresponding one of said socially bookmarkable resources identified by elements found in said searching of said DOM;
program code for detecting a user clicking on one of said resource selection user interface display objects; and
program code for performing said requested social bookmarking operation by bookmarking, in an external social bookmarking system, the corresponding one of the socially bookmarkable resources indicated by the resource selection user interface object clicked on by the user.

13. The system of claim 12, wherein said resource selection user interface display objects comprise visual outlines around each of said socially bookmarkable resources.

14. The system of claim 12, wherein said resource selection user interface display objects comprise text displayed near each of said socially bookmarkable resources.

15. The system of claim 12, wherein said resource selection user interface display objects comprise icons displayed near each of said socially bookmarkable resources.

16. The system of claim 12, wherein each of said resource selection user interface display objects are displayed responsive to said user hovering a cursor over a corresponding one of said socially bookmarkable resources.

17. The system of claim 12, wherein said program code for performing said requested social bookmarking operation comprises program code for passing resource information contained in said element in said document object model (DOM) of said currently loaded Web page that identifies said corresponding one of said socially bookmarkable resources visually indicated by said selected one of said resource selection user interface display objects clicked on by the user to an external social bookmarking system.

18. The system of claim 12, wherein said program code for performing said requested social bookmarking operation comprises:

program code for generating an operation information user interface display object; and program code for pre-filling said operation information user interface display object with resource information describing said socially bookmarkable resource, said resource information extracted from a corresponding one of said elements in said document object model, and wherein said resource information includes a uniform resource locator for said socially bookmarkable resource.

19. The system of claim 18, wherein said consistent uniform resource locator comprises a permalink.

20. The system of claim 18, wherein said resource information further includes a title for said socially bookmarkable resource.

21. The system of claim 18, wherein said resource information further includes a summary for said socially bookmarkable resource.

22. A computer program product comprising:
- a non-transitory computer readable medium, said computer readable medium having program code stored thereon, said program code comprising:
  - program code for receiving a request for a social bookmarking operation;
  - program code for, responsive to said request for said social bookmarking operation, searching a document object model (DOM) of a currently loaded Web page for elements identifying corresponding socially bookmarkable resources displayed within said currently loaded Web page by checking elements in said DOM for elements having a class name matching a predetermined class name, wherein each of said socially bookmarkable resources identified by an element found in said searching is available for performing said requested social bookmarking operation, and modifying said DOM of said currently loaded Web page by placing a resource selection user interface object next to each one of said socially bookmarkable resources identified by elements found in said searching of said DOM;
  - program code for displaying said resource selection user interface display objects within said currently loaded Web page, wherein each of said resource selection user interface display objects visually indicates corresponding ones of said socially bookmarkable resources identified by elements found in said searching of said DOM;
  - program code for detecting a user clicking on one of said resource selection user interface display objects; and
  - program code for performing said requested social bookmarking operation by bookmarking, in an external social bookmarking system, the corresponding one of the socially bookmarkable resources indicated by the resource selection user interface object clicked on by the user.

* * * * *